United States Patent
Porikli et al.

(10) Patent No.: US 8,401,282 B2
(45) Date of Patent: Mar. 19, 2013

(54) METHOD FOR TRAINING MULTI-CLASS CLASSIFIERS WITH ACTIVE SELECTION AND BINARY FEEDBACK

(75) Inventors: Fatih Porikli, Watertown, MA (US); Ajay Joshi, Minneapolis, MN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 435 days.

(21) Appl. No.: 12/732,225

(22) Filed: Mar. 26, 2010

(65) Prior Publication Data
US 2011/0235900 A1    Sep. 29, 2011

(51) Int. Cl.
*G06K 9/62* (2006.01)
*G06K 9/00* (2006.01)
*G06K 9/54* (2006.01)
*G06K 9/60* (2006.01)

(52) U.S. Cl. ......... 382/159; 382/155; 382/181; 382/305

(58) Field of Classification Search .......... 382/155–159, 382/181, 305–307
See application file for complete search history.

(56) References Cited

U.S. PATENT DOCUMENTS

| | | | | |
|---|---|---|---|---|
| 6,834,288 | B2 * | 12/2004 | Chen et al. ............................. | 1/1 |
| 7,840,076 | B2 * | 11/2010 | Bouguet et al. ............... | 382/224 |
| 7,844,116 | B2 * | 11/2010 | Monga ........................... | 382/190 |
| 2008/0025596 | A1 * | 1/2008 | Podilchuk ...................... | 382/155 |
| 2010/0008581 | A1 * | 1/2010 | Bressan ........................ | 382/177 |

* cited by examiner

*Primary Examiner* — Wesley Tucker
(74) *Attorney, Agent, or Firm* — Gene Vinokur; Dirk Brinkman

(57) ABSTRACT

A multi-class classifier is trained by selecting a query image from a set of active images based on a membership probability determined by the classifier, wherein the active images are unlabeled. A sample image is selected from a set of training image based on the membership probability of the query image, wherein the training images are labeled. The query image and the sample images are displayed to a user on an output device. A response from the user is obtained with an input device, wherein the response is a yes-match or a no-match. The query image with the label of the sample image is added to the training set if the yes-match is obtained, and otherwise repeating the selecting, displaying, and obtaining steps until a predetermined number of no-match is reached to obtain the multi-class classifier.

15 Claims, 3 Drawing Sheets

Input: Labeled set $\mathcal{L}$, active pool $\mathcal{A}$, cost matrix $M$ 1. $\mathcal{L}^0 := \mathcal{L}; \mathcal{A}^0 := \mathcal{A}$
2. for round $r = 0$ to $n - 1$ do
3.    foreach image $x_i \in \mathcal{A}^{(r)}$ do
4.       for class $y_i = 1$ to $k$ do
5.          Train multi-class classifier with $\mathcal{L}^{(r)} \cup \{x_i, y_i\}$
6.          Estimate class membership probabilities for images in the active pool $\mathcal{A}^{(r)}$
7.          Compute risk on the active pool $R^{(x_i, y_i)}$
8.       end
9.       Compute expected risk ($\mathcal{L}'^r = \mathcal{L}^r \cup \{x_i\}$) $\mathcal{R}_{\mathcal{L}'^r} = \sum_l P(y_i = l) \cdot R^{(x_i, l)}$
10.       Compute expected annotation cost $C(x_i)$
11.    end
12.    Find image $x^* = \mathrm{argmin}_{x_i \in \mathcal{A}^{(r)}} \mathcal{R}_{\mathcal{L}'^r} + C(x_i)$
13.    Find $V(x^*)$ using Eqn. (4)
14.    if $V(x^*) > 0$ then
15.       Query user with query image $x^*$ and likely sample images until true label $k^*$ is obtained
16.       Set $\mathcal{L}^{(r+1)} := \mathcal{L}^{(r)} \cup \{x^*, k^*\}$; and $\mathcal{A}^{(r+1)} := \mathcal{A}^{(r)} \setminus \{x^*\}$
17.    else return $\mathcal{L}^{(n)} = \mathcal{L}^{(r)}$
18. end

*Fig. 2*

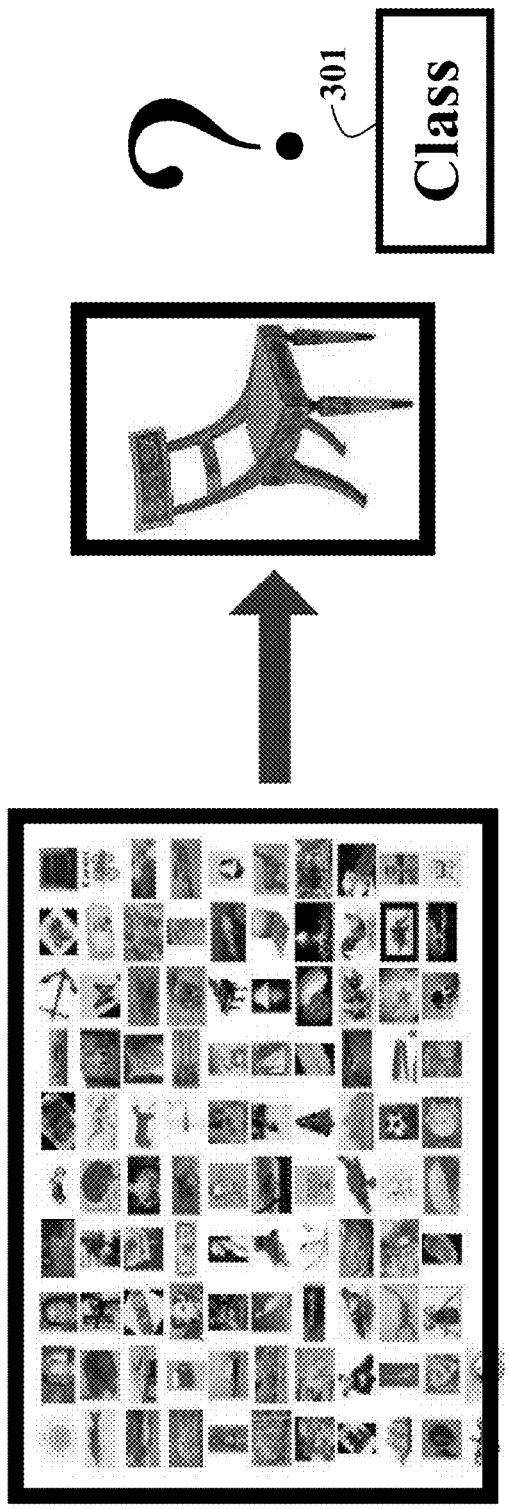
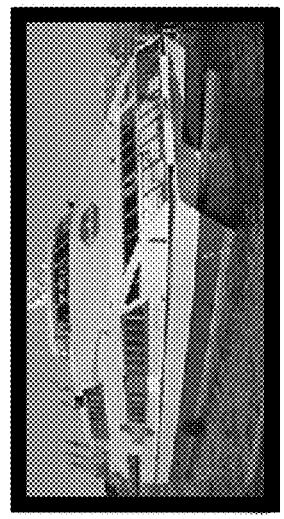
*Fig. 3A Prior Art*
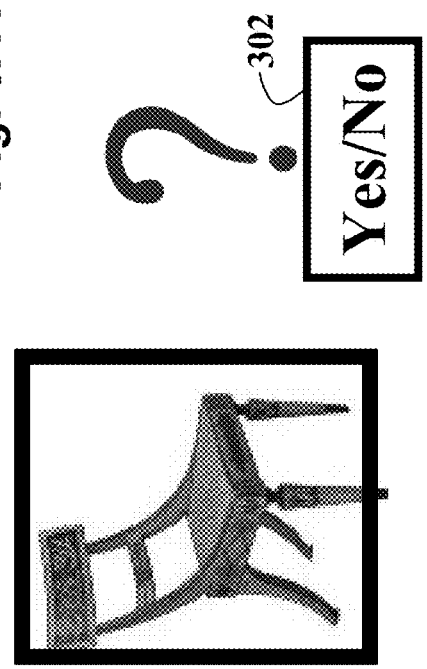
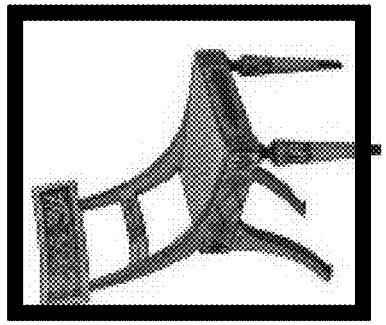
*Fig. 3B*

METHOD FOR TRAINING MULTI-CLASS CLASSIFIERS WITH ACTIVE SELECTION AND BINARY FEEDBACK

FIELD OF THE INVENTION

This invention relates generally to training a multi-class classifier, and more particularly training with active selection and binary feedback.

BACKGROUND OF THE INVENTION

Training a multi-class image classifier requires a large number of unlabeled images. Intelligently exploiting a large number of images is a challenging problem. Active training (often called active learning) aims to select informative images to train classifiers for binary and multi-class classification. Even though multi-class active training methods successfully reduce the number of training images required, they can be labor intensive from a user interaction standpoint for the following reasons:
  (i) for each unlabeled image queried for labeling, the user has to sift through many classes to input the precise one. Especially for images, providing input in this form can be difficult, and sometimes impossible when a huge (or unknown) number of classes are present;
  (ii) the time and effort required increase with an increase in the number of classes;
  (iii) the user interaction is prone to mistakes in labeling, and
  (iv) it is not easily amenable to distributed labeling because all users need to be consistent in the labeling.

Databases of images are ever increasing in size and the image variety. It is common to have thousands of image classes. In order to design methods that are practical at larger scales, it is essential to allow easier modes of labeling and interaction for the user.

SUMMARY OF THE INVENTION

The embodiments of the invention provide a method for training a multi-class classifier that requires only yes/no feedback from a user. During each instance of interaction, the user is presented with two images and has to indicate whether those images belong to the same class or not. Giving such input is extremely easy, and because only two images need to be matched every time, it is also less prone to human mistakes. The method also allows distributed labeling by multiple users.

We provide an expected Value of Information (EVI)-based active selection procedure in a binary feedback model.

The procedure iteratively selects image pairs for labeling so as to maximize accuracy, while also minimizing user labeling effort.

The method can substantially minimize user supervision compared to the conventional training model, on classification problems with as many as 100 classes.

To our best knowledge, this is the first multi-class active training approach that requires only yes/no input responses from one or more users.

BRIEF DESCRIPTION OF THE DRAWINGS

FIG. 2 is a block diagram for pseudo-code for the method of FIG. 1;

FIG. 3A is a schematic of prior art multi-class interactive training;

FIG. 3B is a schematic of the interactive training with binary feedback according to embodiments of the invention.

DETAILED DESCRIPTION OF THE PREFERRED EMBODIMENTS

Figure 1:
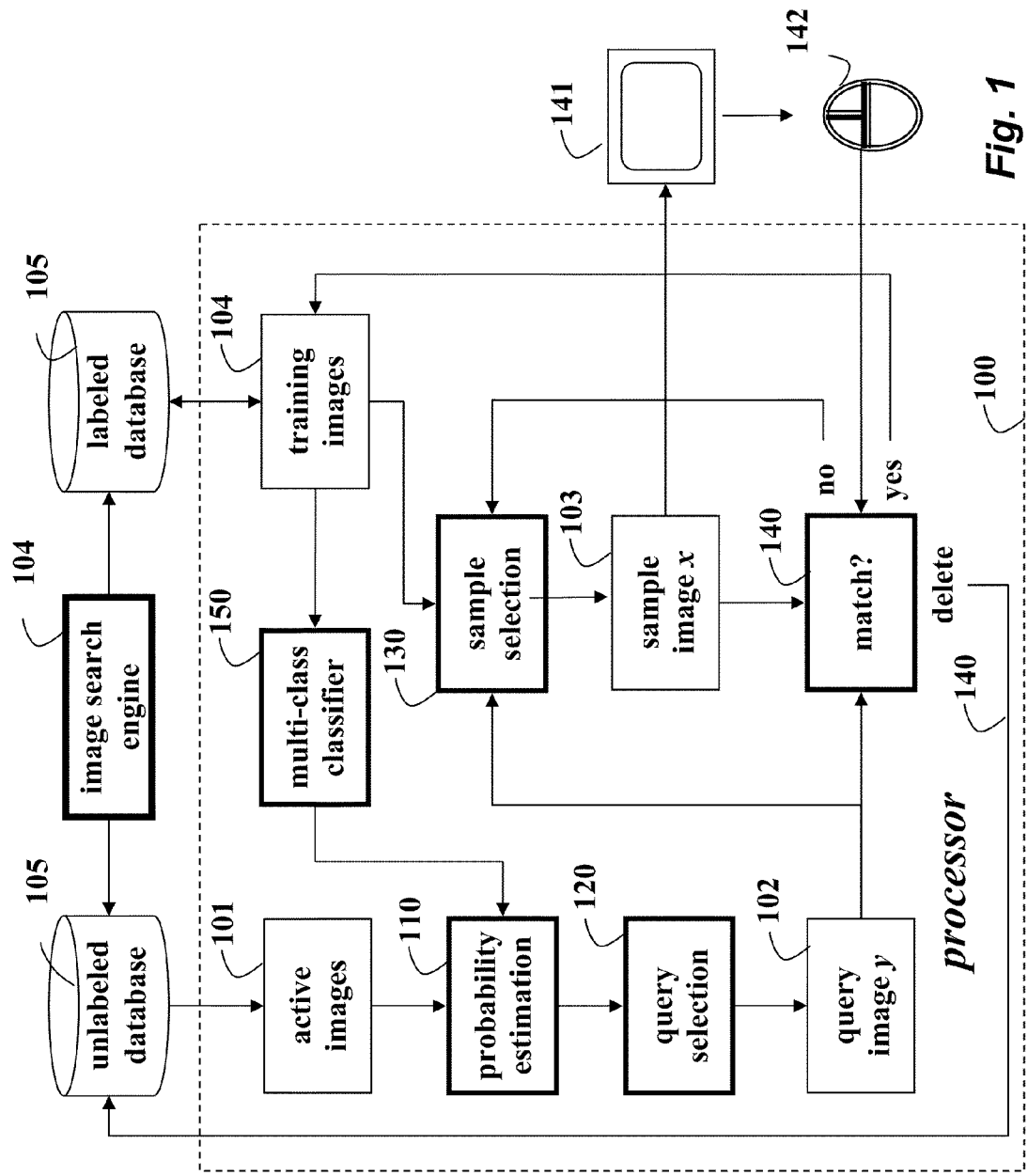
FIG. 1 is a block diagram of a method for training a multi-class classifier according to embodiments of the invention.

FIG. 1 shows a method for actively training a multi-class classifier 150 according to embodiments of the invention. FIG. 2 shows the comparable pseudo-code. The method can be performed in a processor 100, including memory, input/output interfaces, as known in the art.

An active set 101 includes a large number of unlabeled images from which our method selects 120 query images 102 for one or more users to match 140 using output/input devices 141-142. A set of labeled training images 104 is also used to train the multi-class classifier. The training images can be obtained by querying a database 105 of an image search engine 106, or supplied by the user.

A one-versus-one support vector machines (SVM) is used as the underlying classifier. For the multi-class case, one-vs-one SVM (classifiers trained for each pair of classes) are used.

In conventional multi-class active training, an unlabeled query image needs to be selected for user labeling. With our method, however, because user input is only binary (yes/no), we also require a labeled image from a known class to display to the user for matching. Selecting a sample image 103 from the training set 104 is a new aspect of active training that our framework requires.

We focus on query selection 120 and sample selection 130.

Our approach for query, as well as sample selection, is probabilistic, i.e., based on the current training set, class membership probability estimates are obtained for the images in the active set 101. In one embodiment, we use Platt's method to estimate binary probabilities based on the SVM margins, combined with pair-wise coupling with one-vs-one SVM for multi-class probability estimation on the unlabeled images. Platt's method is well known in optimization and machine learning as sequential minimal optimization (SMO), see e.g., U.S. Pat. No. 7,599,897. Platt's method partitions a large quadratic programming (QP) problem into a series of smallest possible QP problems, which are then solved analytically.

Alternatively, we can use a logistic regression classifier to predict a probability of the membership using a logistic curve. Linear discriminant analysis (LDA), e.g., Fisher linear discriminant analyses, can also be used to determine a linear combination of features in the images, which characterize two or more classes.

The query selection 120 selects a query image 102 from the active set 101 using estimated 110 class membership probabilities. Based on the estimated membership probabilities for the query image, the sample selection procedure 130 selects a sample image 103 from the training set 104.

The query image and the sample pair of images are displayed to a user for matching 140 on the output device 141. If a "yes-match" response is obtained using the input device 142, indicating that the query and sample images belong to the same class, the query image is added to the training set 104 along with a class label from the sample image.

If a "no-match" response is obtained, the sample selection procedure 130 is repeatedly invoked to obtain a different sample image. In the latter case, a new class label is initiated and assigned to the query image by the user. Initiating a new class can require many user responses when many classes are present. Below, we described how to overcome this through a fast new class initialization step, along with cluster merging.

The multi-class classifier can then be applied to a set of unlabeled images to obtain a set of detection results, the membership probabilities can be determined for the set of detection results. Then, the set of detecting results with the membership probabilities less than a predetermined threshold can be associated with the set of active images, and the multi-class classifier can be retrained to refine the set of detection results.

Through such a mechanism, the training can be initiated with a very few training images initially selected randomly from a seed set of images.

As the process continues, the active selection procedure requires far fewer queries than random selection to achieve similar classification rate on a separate test set. Note that the method is also able to exploit feedback in terms of precise class labeling, if available. Binary feedback however generalizes the applicability and allows training in new unknown classification problems.

Binary input has been used in the context of clustering data, by asking the user for pair-wise must-link, and cannot-link constraints. However, binary input cannot be extended to classification directly, because, as opposed to classification, all the data are available throughout in batch clustering settings.

The Active Training Method

There are two parts to binary feedback active training:

(i) to select a query image from the active set; and (ii) to select a sample image with a known class label to display to the user along with the query image.

Query Selection

The goal of the query selection is to query informative images, i.e., images that are likely lead to improve the accuracy of the classification. We use an expected value of information (EVI) based on a maximum likelihood of a match with the query image. EVI is well-known within the fields of decision theory.

The idea is to select samples based on an objective function that combines the expected risk, and a cost of user labeling. Consider a risk matrix M for a k-class problem. An entry $M_{ij}$ in the matrix indicates the risk associated with misclassifying an image having true label i as belonging to class j. Correct classification incurs no risk and hence the diagonal elements of the matrix M are zero.

We denote the estimated class membership distribution for an unlabeled image x as $$p_x = \{p^1_x, \ldots, p^k_x\}.$$

Because the true class membership distribution for x is unknown, the actual misclassification risk cannot be determined. Instead, we determine the expected misclassification risk for x as $$\mathcal{R}^{(x)}_\mathcal{L} = \sum_{i=1}^{k} \sum_{j=1}^{k} M_{ij} \cdot (p^i_x \mid \mathcal{L}) \cdot (p^j_x \mid \mathcal{L}), \tag{1}$$

where L is the set of labeled sample on which the probabilities are estimated. A test set T has N images $x_1, \ldots, x_N$. A total expected risk over the test set (normalized by size) is $$\mathcal{R}_\mathcal{L} = \frac{1}{|\mathcal{T}|} \sum_{x \in \mathcal{T}} \sum_{i=1}^{k} \sum_{j=1}^{k} M_{ij} \cdot (p^i_x \mid \mathcal{L}) \cdot (p^j_x \mid \mathcal{L}). \tag{2}$$

The above expression requires that the test set be available while computing the total risk. Typically, the test set is not available beforehand. Therefore, we can use the images in the active set A 101 for determining the expected risk. Indeed, most work on classification uses surrogates to estimate the misclassification risk in the absence of the test set. The expected risk factors can be adjusted depending on an application and domain specifications.

In many scenarios, the entire available set of unlabeled images is used as the active set, which is typically very large, thus an estimate of risk on the active set is fairly reliable. If image y in the set A is added to the labeled training set 104 by acquiring its label from the user, the expected reduction in risk on the active set is $$\mathcal{R}_\mathcal{L} - \mathcal{R}_{\mathcal{L}'} = \frac{1}{|A|} \sum_{x \in \mathcal{A}} \sum_{i=1}^{k} \sum_{j=1}^{k} M_{ij} \cdot (p^i_x \mid \mathcal{L}) \cdot (p^j_x \mid \mathcal{L}) - \tag{3}$$

$$\frac{1}{|\mathcal{A}'|} \sum_{x \in \mathcal{A}'} \sum_{i=1}^{k} \sum_{j=1}^{k} M_{ij} \cdot (p^i_x \mid \mathcal{L}') \cdot (p^j_x \mid \mathcal{L}'),$$

where L'=L∪{y}, and A'=A\{y}.

The above expression captures the value of querying image y and adding image y to the labeled training set. However, we also need consider the cost associated with obtaining feedback from the user for image y. Assume that the cost of obtaining user labeling on image y is C(y).

In our method, we wish to actively select the image that reduces the cost incurred while maximizing the reduction in misclassification risk. Assuming risk reduction and labeling cost are measured in the same units, the joint objective that represents the EVI for the query image y is $$V(y) = \mathcal{R}_\mathcal{L} - \mathcal{R}_{\mathcal{L}'} - C(y). \tag{4}$$

The term $R_L$ in the above equation is independent of y, the example to be selected for query. Therefore, active selection for maximizing EVI can be expressed as a minimization $$y^* = \underset{y \in \mathcal{A}}{\operatorname{argmin}}\, \mathcal{R}_{\mathcal{L}'} + C(y). \tag{5}$$

The above framework can utilize any notions of risk and labeling cost that are specific to the domain. For instance, we can capture the fact that misclassifying examples belonging to certain classes can be more expensive than others. Such a notion can be extremely useful for classifying medical images so as to determine whether the images contain a potentially dangerous tumor. Misclassifying a 'clean' image as having a tumor only incurs the cost of the doctor verifying the classification. However, misclassifying a 'tumor image' as clean can be potentially fatal in a large dataset, wherein the doctor cannot manually look at all the data. In such scenarios, the different misclassification risks can be suitably encoded in the matrix M. As in most work on active training, our evaluation is based on classification accuracy. As such, we use an equal misclassification cost, so that $M_{ij}=1$; for $i \neq j$.

Sample Selection

Given a query image, the sample selection procedure selects sample images so as to minimize the number of responses the user has to provide. In our framework, the sample images belong to a known class, The problem of selecting a sample image then reduces to the problem of finding a likely class for the query image from which a representative image can be selected as the sample image.

When presented with the query image and the sample image, a "yes-match" response from the user actually gives us the class label of the query image itself!

A "no match" response does not provide much information. Suppose that the dataset consists of 100 classes. A "no match" response from the user to a certain query-sample image pair still leaves 99 potential classes to which the query image could belong. Based on this understanding, the goal of selecting a sample image is to maximize the likelihood of a "yes-match" response from the user.

Selecting a sample image (class) can be accomplished by again using the estimated class membership probabilities for the selected query image. For notational simplicity, assume that the query image distribution $\{p_1, \ldots, p_k\}$ is in sorted order such that $p_1 \geq p_2 \geq \ldots \geq p_k$.

The process proceeds as follows. Select a representative sample image from class 1 and obtain the user response. As long as a "no match" response is obtained for class i−1, select a sample image from class i to present the user. This is continued until a "yes-match" response is obtained. Through such a scheme, sample images from the more likely classes are selected earlier in the process, in an attempt to minimize the number of user responses required.

Labeling Cost

In the binary feedback setting, it is reasonable to assume that each binary comparison requires a constant cost (time) for labeling. Thus, for each query image, the cost incurred to obtain the class label is equal to the number of binary comparisons required. Because this number is unknown, we determine its expectation based on the estimated class membership distribution instead.

If the distribution is assumed to be in sorted order as above, the expected number of user responses to get a "yes-match" response is $$C(x) = p_1^x + \sum_{j=2}^{k} (1 - p_1^x) \ldots (1 - p_{j-1}^x) \cdot p_j^x \cdot j, \quad (6)$$

which is also the user labeling cost.

We can scale the misclassification risk (by scaling M) with the real-world cost incurred to determine the true risk, which is in the same units as labeling cost. Here, we select the true risk as the expected number of misclassifications in the active set, and determine the risk by scaling M with the active set size. Along with our choice of C(x), this amounts to equating the cost of each binary input from the user to every misclassification, i.e., we obtain one binary input from the user for correctly classifying one unlabeled image.

Termination Criterion

The above EVI-based objective function leads to an appealing termination criterion. We can terminate when the maximum EVI for any unlabeled image is negative, $$\text{argmax}_{x \in A} V(x) < 0.$$

With our definition of risk and cost, negative values of EVI indicate that a single binary input from the user is not expected to reduce the number of misclassifications by even one, hence querying is not worth the information obtained.

It should be noted that different notions of real-world risk and labeling cost can be employed instead if specific domain knowledge is available. The selection and stopping criteria directly capture the particular quantities used.

Another termination criterion is to obtain a "disregard" response from the user in addition to the yes- and no-match responses. This enables user to delete 143 the current query image from the set of training images. Such deleted images might be noisy images, images depicting multiple objects, images that are obscure and images do not belong to any semantic class that we want the classifier to learn.

Initiating New Classes

Many active training methods make the restrictive assumption that the initial training set contains examples from all classes. This assumption is unrealistic for most real problems, because the user has to explicitly construct a training set with all classes, defeating our goal of reducing supervision. Also, if a method is expected to operate over long periods of time, handling new classes is essential. Thus, we start with small seed sets, and allow dynamic addition of new classes. In the sample selection method described above, the user is queried by showing sample images until a "yes-match" response is obtained. However, if the query image belongs to a class that is not present in the current training set, many queries will be needed to initiate a new class.

Instead, we initiate a new class when a fixed small number, e.g., 5, of "no-match" responses are obtained. With good class models, the expected distributions correctly model the classes of unlabeled images. Hence, "no-match" responses to the few most likely classes often indicates the presence of a previously unencountered class.

However, it may happen that the unlabeled image belongs to a class present in the training set. In such cases, creating a new class and assigning the class to the unlabeled image results in overclustering. This is dealt with by merging of trained classes by an agglomerative clustering. (cluster merging), following a min-max cut procedure, along with user input. The clustering combines two classes if a between-class similarity score is larger than a predetermined threshold within the agglomerative clustering. In this case, two clusters are merged if the response is the yes-match when two training images from the two classes are displayed to the user and asking whether the two classes should be merged or not.

The basic idea in agglomerative clustering is to iteratively merge two clusters that have a highest similarity (linkage value) $l(C_i, C_j)$. For min-max clustering, the linkage function is $$l(C_i, C_j) = s(C_i, C_j)/(s(C_i, C_i) s(C_j, C_j)),$$

where s indicates a cluster similarity score:

$$s(C_i, C_j) = \sum_{x \in C_i} \sum_{y \in C_j} K(x, y).$$

Here, K is the kernel function that captures similarity between two images x and y (the same kernel function is also used for classification with SVM).

In our method, we evaluate cluster linkage values after each iteration of user feedback. If the maximum linkage value (indicating cluster overlap) is for clusters $C_i$ and $C_j$, and is above a threshold of 0.5, we query the user by showing two images from clusters $C_i$ and $C_j$.

A "yes-match" response results in merging of the two clusters. Our method is much simpler than the unsupervised clustering because we have user feedback. As such, the method is relatively insensitive to the particular threshold used, and less noise is encountered. Also, note that we do not need to determine the linkage values at each iteration. Only a simple incremental computation is required. In summary, new classes are initiated quickly, and erroneous ones are corrected by cluster merging with little user feedback.

Computational Considerations

The computational complexity of each query iteration in our procedure in FIG. 2 is $O(N^2k^3)$, with an active set of size N and k classes. Although it works well for small problems, the cost can be impractical at larger scales. Therefore, we use some approximations to significantly reduce the computational expense, and make the implementation efficient for large problems with many classes.

Expected Value Computation

In the above procedure, estimating the expected risk is expensive. For each unlabeled image, we need to train classifiers, assuming that the image can belong to any of the possible classes, (line 4 in the procedure of FIG. 2). This can be slow when many classes are present.

To overcome this, we make the following observation. Given the estimated probability distribution of an unlabeled image, it is unlikely to belong to the classes that are assigned low probability values, i.e., the image most likely belongs to the classes that have the highest estimated probabilities.

As such, instead of looping over all possible classes, we can only loop over the most likely classes. In particular, we loop over only the top 2 most likely classes, as they contain most of the discriminative information, while the smaller probability values contain little information.

Such an approximation relies to some extent on the correctness of the estimated model, which implies an optimistic assumption often made for computational tractability. Further, we can use the same "top-2" approximation, for computing the expected risk (line 9) on unlabeled images, as an approximation to Equation (1).

Clustering for Estimating Risk

In the above procedure, the risk needs to be estimated on the entire active set. Instead, we first cluster the unlabeled images in the active set using the kernel k-means procedure. Then we form a new unlabeled image set by selecting one representative (closest to the centroid) image from each cluster, and estimate risk on this reduced set.

Initially, the clustering is performed only once, and not during every query iteration. In our implementation, we fix the number of clusters as $\frac{1}{100}$ fraction of the active set size. This approximation rarely (less than 5% of the time) changes the images selected actively, and makes a negligible difference in the estimated risk value, and the future classification accuracy.

Another approximation used is sampling the active set to obtain a smaller set on which the EVI is performed. Efficient active selection heuristics, such as uncertainty sampling, can be exploited to form the small set. Using an uncertainty sampling procedure, we first sample a small set of about 50 images from the active set, and then select the images from this smaller set using the EVI.

With the above approximations, the complexity of each query iteration becomes $O(Nk^2)$, a large improvement over the original version. This is much better than the often observed cubic scaling for active selection in the prior art.

EFFECT OF THE INVENTION

We describe a new multi-class active training framework that requires only binary feedback from the user. Our method substantially reduces user training time and effort. The method is robust to real-world issues such as population imbalance and noise.

FIG. 3A shows conventional interactive classifier training where the user needs to input a class 301 for the query image from a large dataset possibly including of hundreds of categories. In contrast, as shown in FIG. 3B, the user only indicates whether or not (Yes/No 302) the query image and the sample image match and therefore are members of the same class.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for training a multi-class classifier, comprising the steps of:
    selecting a query image from a set of active images based on a membership probability determined by the classifier, wherein the active images are unlabeled;
    selecting a sample image from a set of training image based on the membership probability of the query image, wherein the training images are labeled;
    displaying the query image and the sample images to a user on an output device;
    obtaining a response from the user with an input device, wherein the response is a yes-match or a no-match;
    adding the query image with the label of the sample image to the training set if the yes-match is obtained, and otherwise repeating the selecting, displaying, and obtaining steps until a predetermined number of no-match is reached to obtain the multi-class classifier;
    applying the multi-class classifier to a set of unlabeled images to obtain a set of detection results;
    determining membership probabilities of the set of detection results;
    associating the set of detecting results with the membership probabilities less than a predetermined threshold with the set of active images; and
    retraining the multi-class classifier to refine the set of detection results, wherein steps of the method are performed by a processor.

2. The method of claim 1, further comprising:
    estimating the membership probability using a one-versus-one support vector machines, and sequential minimal optimization.

3. The method of claim 2, wherein the membership probability is estimated using logistic regression classifiers.

4. The method of claim 2, wherein the membership probability is estimated using Fisher discriminant analysis over multiple classes.

5. The method of claim 1, further comprising:
    assigning a new class label to the query image if the predefined number of no-match is reached.

6. The method of claim 1, wherein the initial set of training image are selected randomly from a seed set of images.

7. The method of claim 1, wherein the initial set of training image is selected by querying a database of an image search engine.

8. The method of claim 1, wherein the initial set of training image is supplied by the user.

9. The method of claim 1, wherein a plurality of users are used to obtain a plurality of responses.

10. The method of claim 1, wherein the selecting of the query image is based on an expected value of information (EVI), with an objective function that combines an expected risk, and a cost of user labeling, and the selecting of the sample image is based on maximum likelihood of a match with the query image.

11. The method of claim 1, further comprising:
merging of trained classes by an agglomerative clustering.

12. The method of claim 11, further comprising:
combining two classes if a between-class similarity score is larger than a predetermined threshold within the agglomerative clustering.

13. The method of claim 11, further comprising:
combining two clusters if the response is the yes-match when the two classes are displayed to the user, and asking whether the two classes should be merged or not.

14. The method of claim 1, further comprising:
adjusting the expected risk factors depending on an application and domain specifications.

15. The method of claim 1, further comprising:
obtaining a disregard response from the user to delete the query image from set of training images.

* * * * *